(12) United States Patent
Chen

(10) Patent No.: US 10,487,574 B2
(45) Date of Patent: Nov. 26, 2019

(54) VEHICLE COVER ASSEMBLY

(71) Applicant: Jack Chen, New Taipei (TW)

(72) Inventor: Jack Chen, New Taipei (TW)

(73) Assignee: SPORTSMAN CORPORATION, New Taipei (TW)

( * ) Notice: Subject to any disclaimer, the term of this patent is extended or adjusted under 35 U.S.C. 154(b) by 168 days.

(21) Appl. No.: 15/652,222

(22) Filed: Jul. 17, 2017

(65) Prior Publication Data
US 2019/0017322 A1    Jan. 17, 2019

(51) Int. Cl.
| | | |
|---|---|---|
| B60J 11/00 | (2006.01) | |
| E06B 9/80 | (2006.01) | |
| B60J 11/02 | (2006.01) | |
| E05B 65/00 | (2006.01) | |
| E04F 10/06 | (2006.01) | |
| E05B 37/02 | (2006.01) | |

(52) U.S. Cl.
CPC .............. *E06B 9/80* (2013.01); *B60J 11/02* (2013.01); *E04F 10/06* (2013.01); *E04F 10/0666* (2013.01); *E05B 65/006* (2013.01); *E05B 37/02* (2013.01); *E06B 2009/802* (2013.01)

(58) Field of Classification Search
CPC ........ B60J 11/025; B60J 11/02; E01F 13/028; E06B 9/80; E06B 2009/802; E04F 10/06; E04F 10/0666; E05B 65/006; E05B 37/02; E05B 73/00
See application file for complete search history.

(56) References Cited

U.S. PATENT DOCUMENTS

| | | | | | |
|---|---|---|---|---|---|
| 2,688,513 | A | * | 9/1954 | Poirier | B60J 11/02 135/115 |
| 2,696,249 | A | * | 12/1954 | Prokop | G03B 21/58 160/24 |
| 2,822,040 | A | * | 2/1958 | Petrick | G03B 21/58 160/24 |
| 4,549,444 | A | * | 10/1985 | Forquer | E06B 9/76 160/133 |
| 4,574,504 | A | * | 3/1986 | Holmer | B65D 59/04 206/225 |
| 5,036,898 | A | * | 8/1991 | Chen | B60J 1/2033 160/23.1 |
| 5,473,917 | A | * | 12/1995 | Say | E05B 73/0011 280/814 |
| 5,698,073 | A | * | 12/1997 | Vincenzi | E05B 65/0021 160/188 |
| 6,059,010 | A | * | 5/2000 | Yang | B60J 11/02 160/24 |

(Continued)

*Primary Examiner* — Daniel P Cahn
(74) *Attorney, Agent, or Firm* — Hershkovitz & Associates, PLLC; Abe Hershkovitz

(57) ABSTRACT

A vehicle cover assembly has a body and a lock device. The body has a housing, a reeling device, and a cover fabric. The reeling device is mounted in the housing and has a reeling axle. The cover fabric is connected with and is selectively reeled around the reeling axle. The lock device has a casing, a pushing rod, and a lock cylinder. The casing is mounted on the housing. The pushing rod is moveably mounted through the casing and has an end selectively engaged with one end of the reeling axle. The lock cylinder is mounted in the casing and is selectively engaged with the pushing rod. When the lock cylinder is engaged with the pushing rod, the pushing rod is engaged with the reeling axle.

15 Claims, 7 Drawing Sheets

(56) References Cited

U.S. PATENT DOCUMENTS

| | | | | |
|---|---|---|---|---|
| 6,382,005 B1* | 5/2002 | White | ............... | E05B 65/0021 160/188 |
| 6,684,541 B2* | 2/2004 | McPhaul | ............... | G09F 11/18 160/301 |
| 7,464,982 B1* | 12/2008 | Lin | ............... | B60J 11/02 296/136.01 |
| D642,112 S * | 7/2011 | Farber | ............... | D12/414 |
| 9,610,834 B2* | 4/2017 | Joseph | ............... | B60R 19/48 |
| 2002/0073751 A1* | 6/2002 | Wilson | ............... | B62H 5/003 70/233 |
| 2005/0212322 A1* | 9/2005 | Porter | ............... | B60J 11/02 296/98 |
| 2006/0193082 A1* | 8/2006 | Ota | ............... | G11B 23/046 360/132 |
| 2006/0232095 A1* | 10/2006 | Sedighzadeh | ............... | B60J 11/02 296/98 |
| 2007/0177265 A1* | 8/2007 | Focardi | ............... | B60J 11/02 359/509 |
| 2008/0135145 A1* | 6/2008 | Hsieh | ............... | B60J 11/02 150/166 |
| 2008/0186665 A1* | 8/2008 | Kuo | ............... | E05B 17/2038 361/679.57 |
| 2010/0181544 A1* | 7/2010 | Wettern | ............... | E01F 13/028 256/73 |
| 2013/0233498 A1* | 9/2013 | Kaya | ............... | B60J 11/02 160/127 |
| 2013/0305790 A1* | 11/2013 | Seele | ............... | E05B 73/0011 70/58 |
| 2014/0000322 A1* | 1/2014 | Williams | ............... | E05B 73/0011 70/18 |
| 2014/0096920 A1* | 4/2014 | MacDonald | ............... | E06B 9/50 160/291 |
| 2014/0312156 A1* | 10/2014 | Minino | ............... | B65H 75/4402 242/397 |
| 2015/0020558 A1* | 1/2015 | Williams | ............... | B62H 5/00 70/18 |
| 2015/0300087 A1* | 10/2015 | Watanabe | ............... | B60J 1/2038 160/301 |
| 2016/0075222 A1* | 3/2016 | Chen | ............... | B60J 11/02 160/239 |
| 2017/0259660 A1* | 9/2017 | Chaul, Sr. | ............... | B60J 11/025 |
| 2019/0031008 A1* | 1/2019 | Cassidy | ............... | B60J 11/025 |

* cited by examiner

US 10,487,574 B2

VEHICLE COVER ASSEMBLY

BACKGROUND OF THE INVENTION

1. Field of the Invention

The present invention relates to a vehicle cover assembly, and more particularly to a vehicle cover assembly having a lock device.

2. Description of Related Art

An indoor parking lot is a preferable location for vehicle-parking because the indoor parking lot can shade sunlight and rain. However, the indoor parking lot is a building that is costly to build, so to park indoors requires high cost. As the indoor parking lot cannot achieve all the parking needs, many vehicles are stilled parked in outdoor parking lots. In the outdoor parking lots, the vehicles are usually exposed to sunlight, rain, and wind, and further to dust storms in dry countries or snow in high latitude countries.

To protect the vehicle parked in an outdoor parking lot, a cover fabric is applied to cover the vehicle and to separate the vehicle from the outside environment. To conveniently expand and store the cover fabric, the cover fabric is usually reeled in a housing to form a vehicle cover assembly. When in use, the cover fabric is expanded from the housing to cover a vehicle. The cover fabric is connected with a reeling device that provides a torsion force to reel the cover fabric. Accordingly, when the cover fabric is detached from the vehicle, the cover fabric can be automatically reeled in the housing, such that any person, even an unauthorized person, can reel the cover fabric.

To overcome the shortcomings, the present invention tends to provide a vehicle cover assembly to mitigate or obviate the aforementioned problems.

SUMMARY OF THE INVENTION

The main objective of the invention is to provide a vehicle cover assembly that has a lock device to prevent a cover fabric from being reeled by any unauthorized person.

The vehicle cover assembly has a body and a lock device. The body has a housing, a reeling device, and a cover fabric. The reeling device is mounted in the housing and has a reeling axle. The cover fabric is connected with and is selectively reeled around the reeling axle. The lock device has a casing, a pushing rod, and a lock cylinder. The casing is mounted on the housing. The pushing rod is moveably mounted through the casing and has an end selectively engaged with one end of the reeling axle. The lock cylinder is mounted in the casing and is selectively engaged with the pushing rod. When the lock cylinder is engaged with the pushing rod, the pushing rod is engaged with the reeling axle.

Other objects, advantages and novel features of the invention will become more apparent from the following detailed description when taken in conjunction with the accompanying drawings.

DETAILED DESCRIPTION OF PREFERRED EMBODIMENT

Figure 1:
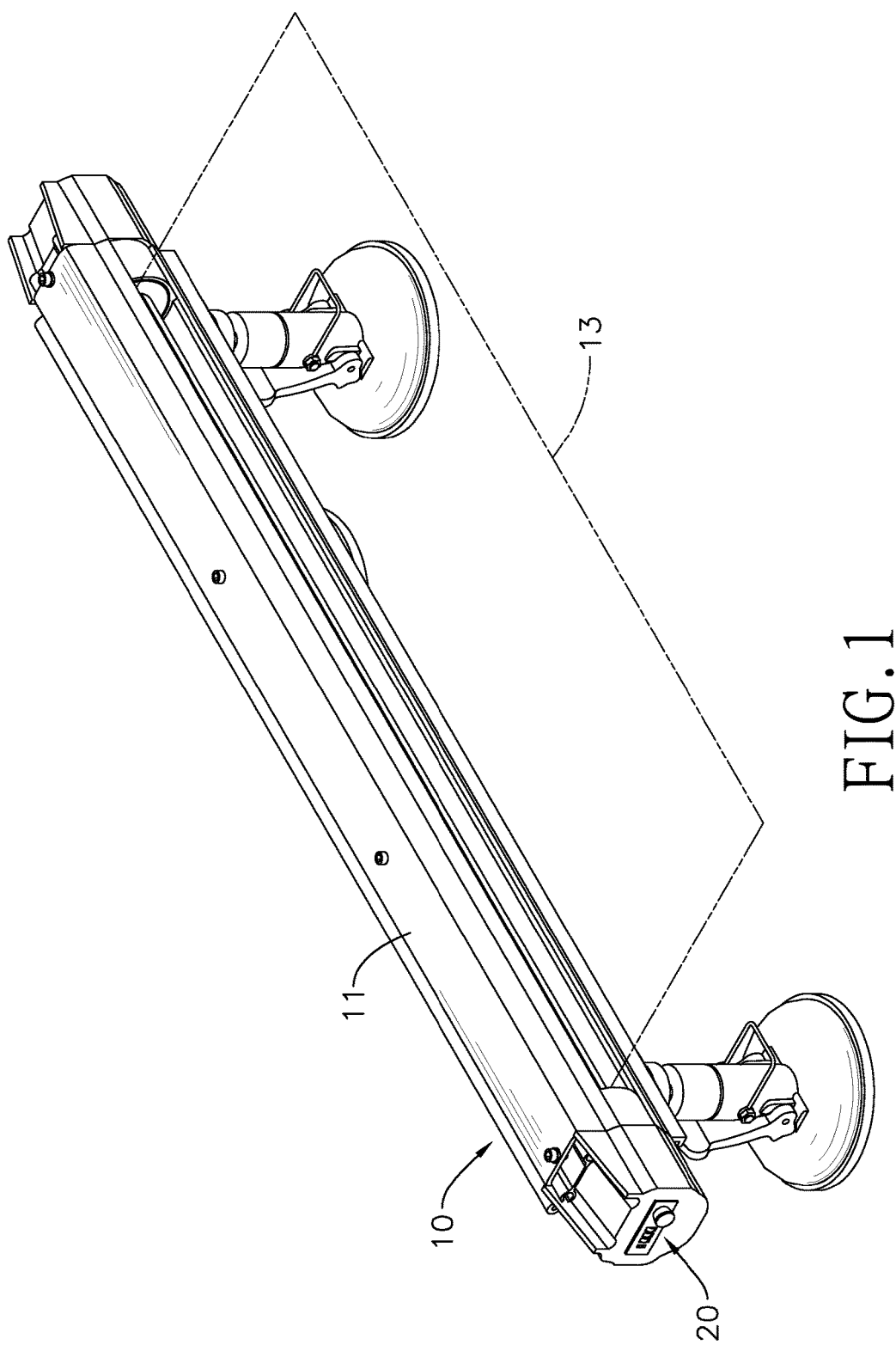
FIG. 1 is a perspective view of a vehicle cover assembly in accordance with the present invention.
Figure 2:
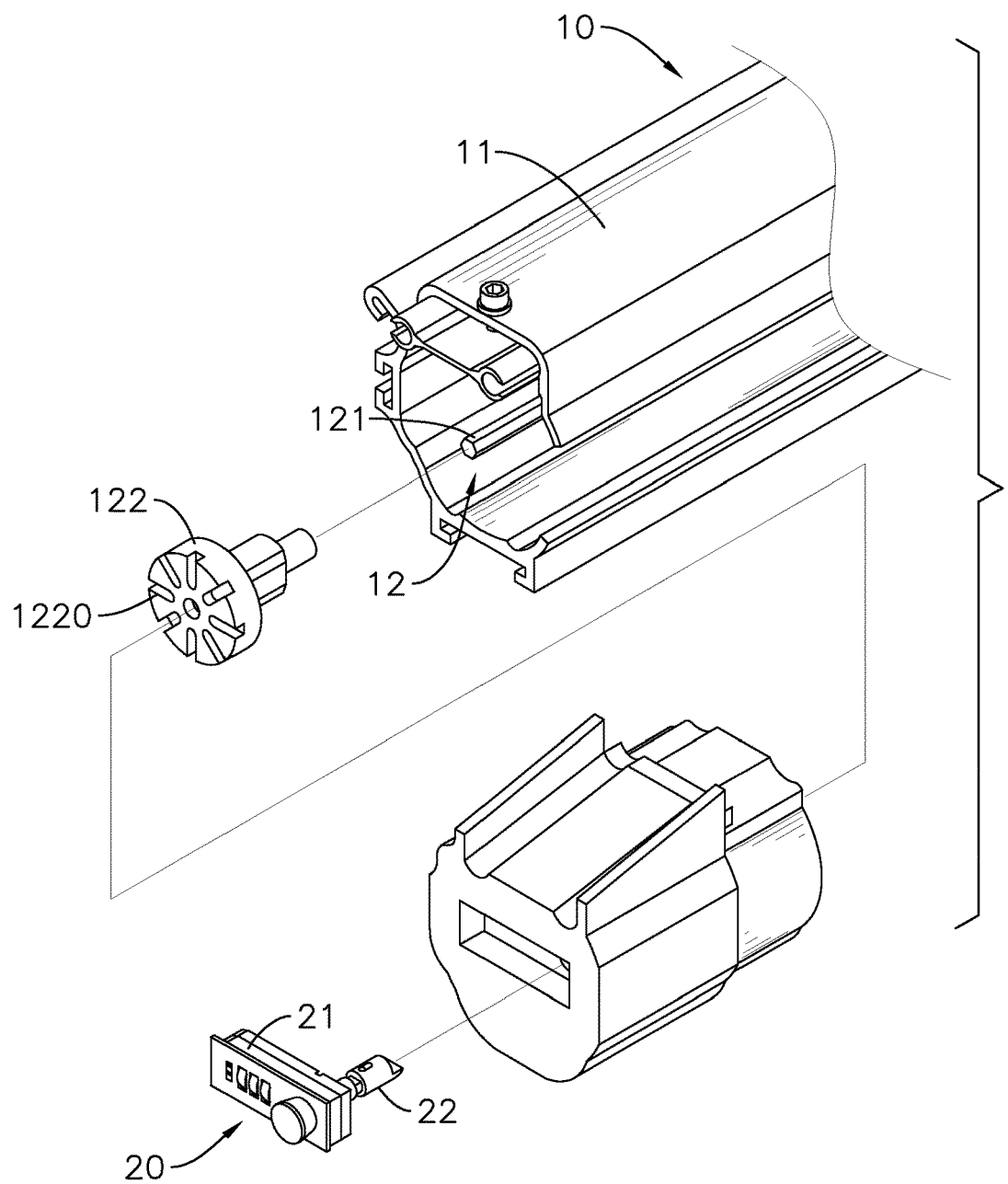
FIG. 2 is an enlarged exploded perspective view of the vehicle cover assembly in FIG. 1.
Figure 3:
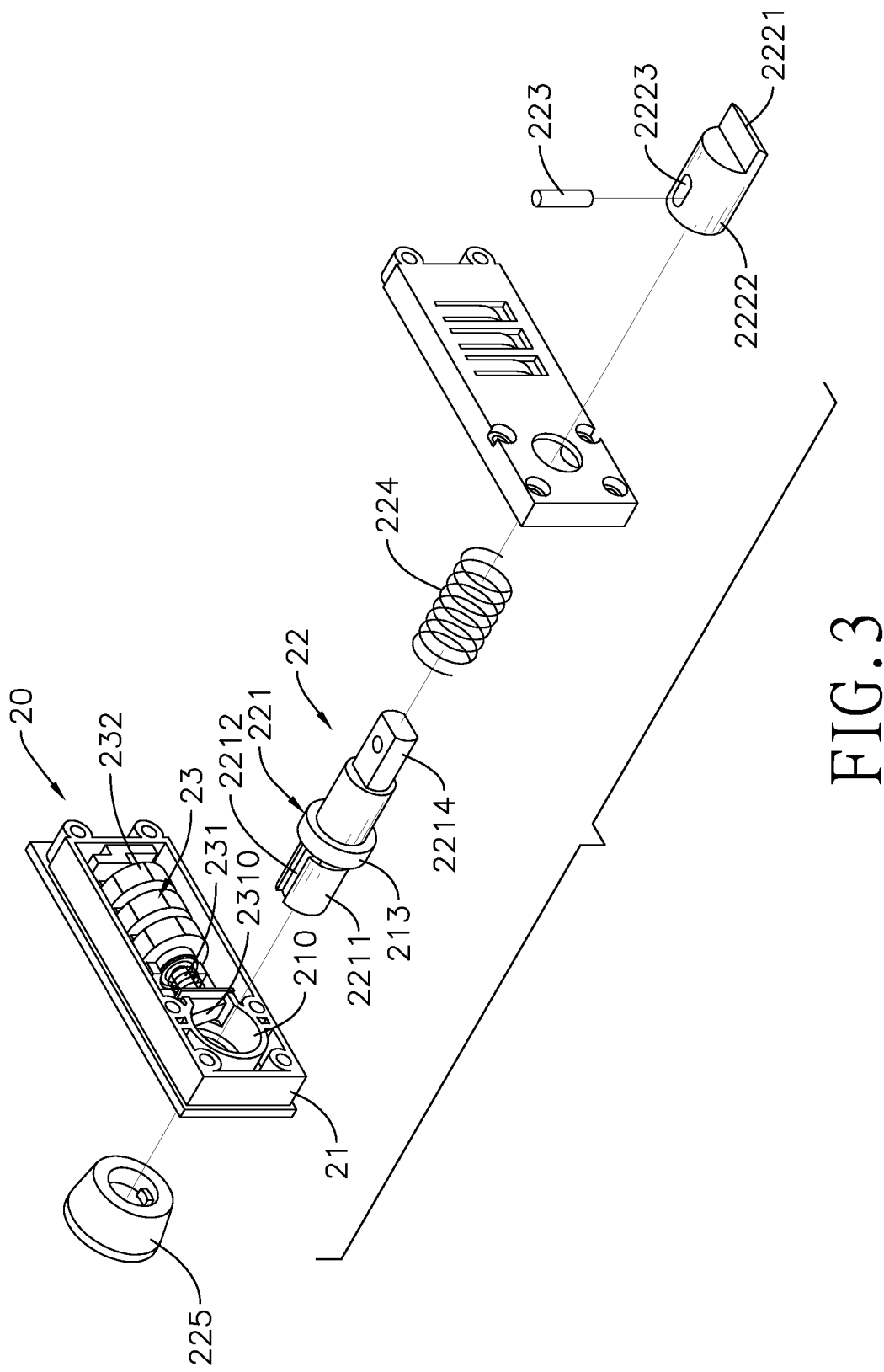
FIG. 3 is an enlarged exploded perspective view of the lock device of the vehicle cover assembly in FIG. 1.

With reference to FIGS. 1 to 3, a vehicle cover assembly in accordance with the present invention comprises a body 10 and a lock device 20. The body 10 comprises a housing 11, a reeling device 12, and a cover fabric 13. The reeling device 12 is mounted in the housing 11 and has a reeling axle 121. The reeling axle 121 has a rotator 122, and multiple engaging recesses 1220 are defined in the rotator 122 and arranged annularly. Preferably, the rotator 122 is mounted on one end of the reeling axle 121, and the engaging recesses 1220 are defied in one side of the rotator 122. Alternatively, the rotator 122 can be mounted on a middle portion of the reeling axle 121, and the engaging recesses 1220 are defined in a periphery of the rotator 122.

The cover fabric 13 is connected with and selectively reeled around the reeling axle 121. The reeling device 12 may comprise a torsion unit to provide a torsion force to rotate the reeling axle 121 and to reel the cover fabric 13 around the reeling axle 121. Preferably, the torsion unit may be a torsion spring.

Figure 6:
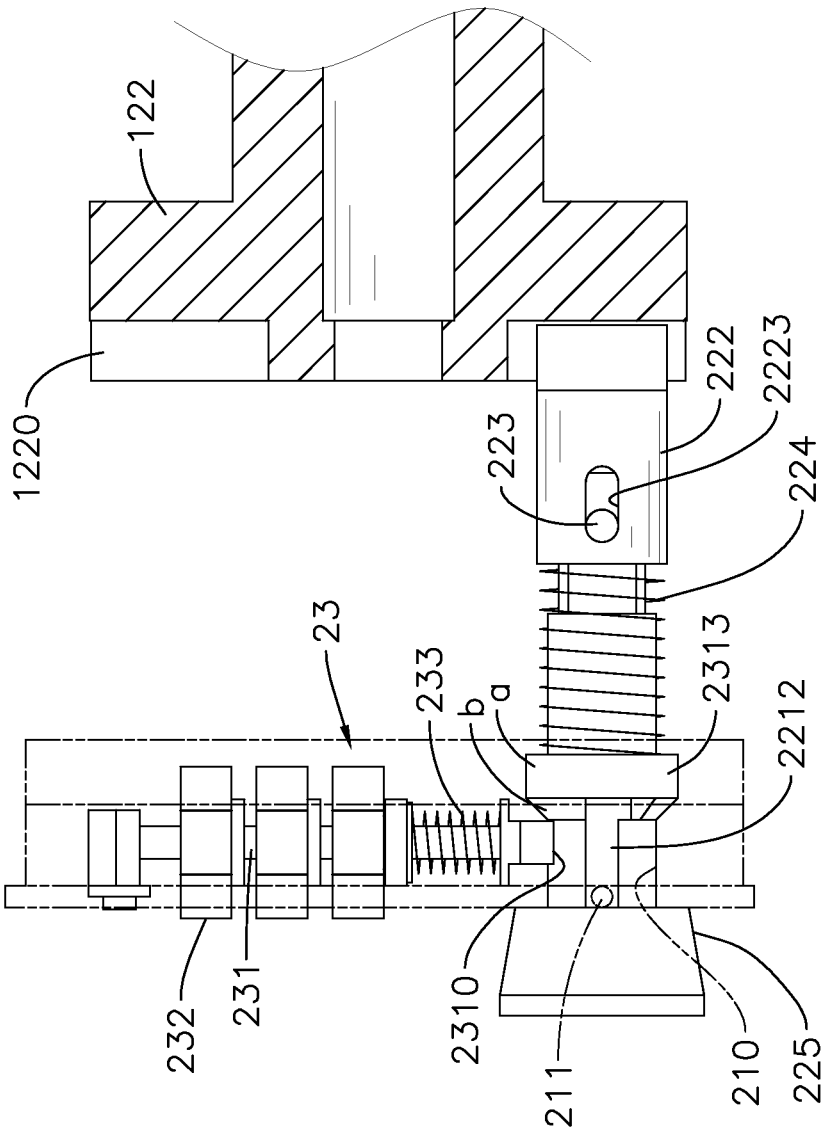
FIG. 6 is an enlarged operational top view in partial section of the lock device of the vehicle cover assembly in FIG. 1.

The lock device 20 comprises a casing 21, a pushing rod 22, and a lock cylinder 23. The casing 21 is mounted securely on the housing 11 and has a through hole 210 defined through the casing 21. A protrusion 211 is formed on and protrudes from an inner surface of the through hole 210 as shown in FIG. 6.

The pushing rod 22 is operationally mounted through the casing 21. Preferably, the pushing rod 22 is moveably mounted through the casing 21 along a longitudinal direction of the pushing rod 22 and is rotatable along an axis that is parallel with the longitudinal direction of the pushing rod 22. The pushing rod 22 has an end selectively engaged with the rotator 122. Preferably, the pushing rod 22 comprises a first rod body 221, a second rod body 222, a positioning element 223, a resilient member 224, and a rotating knob 225.

The first rod body 221 is mounted through the casing 21 and is moveable and rotatable relative to the casing 21. The first rod body 221 comprises a main body segment 2211, a groove 2212, an annular flange 2213, and a connection segment 2214.

The main body segment 2211 is mounted through the through hole 210 of the casing 21 and is selectively held in the through hole 210. With further reference to FIG. 6, the groove 2212 is longitudinally defined in an outer surface of the main body segment 2211, and the groove 2212 is selectively located in the through hole 210. The protrusion 211 in the through hole 210 extends into the groove 2212. The groove 2212 extends longitudinally along the longitudinal direction of the pushing rod 22 and has an end that is adjacent to the reeling axle 121 and extending laterally along a periphery of the pushing rod 22. Accordingly, the groove 2212 is L-shaped.

The annular flange 2213 is formed around the main body segment 2211 of the first rod body 221. Preferably, the annular flange 2213 is closer to the reeling device 12 than the groove 2212 is. The annular flange 2213 has a periphery a and a conical surface b formed on a side of the annular flange 2213 opposite the reeling device 12.

The connection segment 2214 is formed on an end of the main body segment 2211 that is adjacent to the reeling device 12 and extends toward the reeling device 12. The connection segment 2214 has a diameter smaller than a diameter of the main body segment 2211 and is noncircular in cross section. Preferably, the connection segment 2214 may be oval or polygonal in cross section. In the present embodiment, the connection segment 2214 has two flat surfaces diametrically opposite each other.

The second rod body 222 has a first end moveably connected with the first rod body 221, a second end selectively engaged with one of the engaging recesses 1220 of the reeling axle 12, and an inclined surface 2221 formed on the second end of the second rod body 222. Accordingly, the second end of the second rod body 222 is wedged in cross section. Preferably, the second rod body 222 is mounted around the connection segment 2214 of the first rod body 221 and is moveable relative to the connection segment 2214 along the longitudinal direction of the pushing rod 22.

The second rod body 222 has a connecting recess 2222 and at least one channel 2223. The connecting recess 2222 is defined in an end of the second rod body 222 that is opposite the reeling device 12. The connection segment 2214 of the first rod body 221 is slidably inserted into the connecting recess 2222. The at least one channel 2223 is radially defined in the second rod body 222 and extends along the longitudinal direction of the pushing rod 22. In the present embodiment, two channels 2223 are implemented and are diametrically opposite each other.

The positioning element 223 is mounted securely on the connection segment 2214 of the first rod body 221 and has at least one end held respectively in the at least one channel 2223 in the second rod body 222. In the present embodiment, the positioning element 223 is mounted through the connection segment 2214, and has two ends protruding from the connection segment 2214 and mounted respectively in the two channels 2223. With the arrangement of the positioning element 223, the first rod body 221 is moveable relative to the second rod body 222 and is kept from being detached from the second rod body 222.

The resilient member 224 has two ends connected respectively with the first rod body 221 and the second rod body 222 to push the second rod body 222 to engage with one of the engaging recesses 1220. In the present embodiment, the resilient member 224 is a compression spring. The rotating knob 225 is mounted on an end of the main body segment 2211 of the first rod body 221 opposite the reeling device 12 and is exposed from the casing 21 to allow the pushing rod 22 to be operated via the rotating knob 225.

The lock cylinder 23 is mounted in the casing 21, is selectively engaged with the pushing rod 22, and selectively abuts the periphery a or the conical surface b of the annular flange 2213. The lock cylinder 23 has a movable axle 231, multiple wheels 232, and a resilient member 233.

The movable axle 231 has a pushing end selectively abutting the periphery a or the conical surface b of the annular flange 2213 of the pushing rod 22. Preferably, the pushing end is a block and has an inclined surface 2310 selectively abutting the periphery a or the conical surface b of the annular flange 2213 of the pushing rod 22. The wheels 232 are rotatably mounted around the moveable axle 231 and each of the wheels 232 is partially exposed from the casing 21. The resilient member 233 is connected with the pushing end of the moveable axle 231 to push the pushing end to abut against the pushing rod 22.

With such an arrangement, when the wheels 232 are respectively rotated to desired positions, the lock cylinder 23 is unlocked and the movable axle 231 can be moved to abut the periphery a or the conical surface b of the annular flange 2213. Thus, the abutting position between the pushing end of the movable axle 231 and the pushing rod 22 can be changed. When one of the wheels 232 is not at the desired position, the lock cylinder 23 is locked and the movable axle 231 is kept from moving and is engaged with the first rod body 221 of the pushing rod 22.

Figure 4:
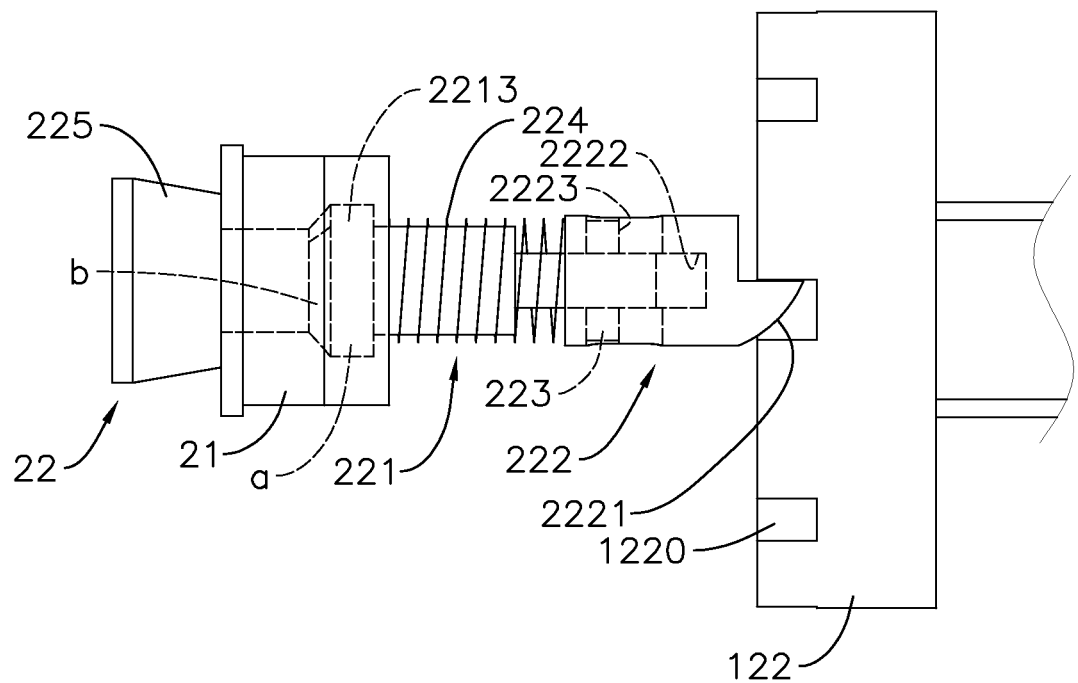
FIG. 4 is an enlarged operational side view of the lock device of the vehicle cover assembly in FIG. 1.
Figure 5:
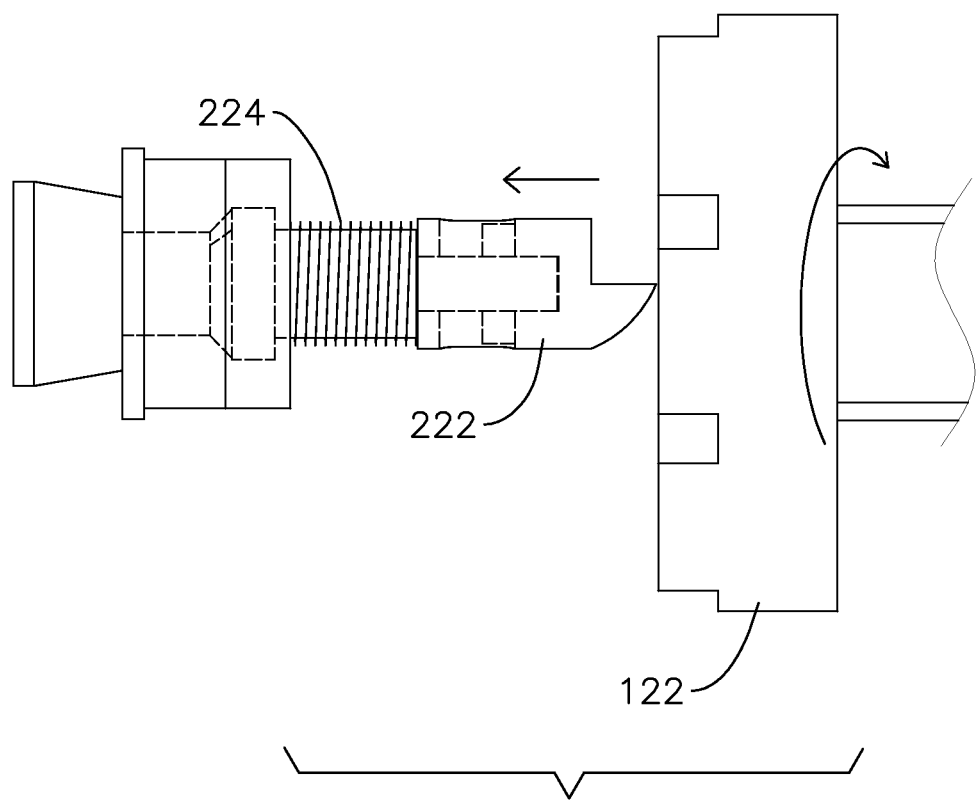
FIG. 5 is another enlarged operational side view of the lock device of the vehicle cover assembly in FIG. 1.

With reference to FIGS. 1,4, and 5, in a reeled position of the cover fabric 13, the second rod body 222 of the pushing rod 22 is engaged with one of the engaging recesses 1220 in the rotator 122. To expand the cover fabric 13, because the second rod body 222 has the inclined surface 2221, the second rod body 222 will be pushed to be disengaged from the corresponding one of the engaging recesses 1220 and is moved toward the first rod body 221 when the reeling axle 121 is rotated by expanding the cover fabric 13.

When the cover fabric 13 is expanded to a desired position, the cover fabric 13 is slightly released and the reeling axle 121 is rotated in reverse by the torsion unit. With the force provided by the resilient member 224, the second rod body 222 is pushed toward the reeling axle 12. Accordingly, the second rod body 222 will be automatically engaged with the one of the engaging recesses 1220. Consequently, the reeling axle 121 will be kept from rotating, such that the cover fabric 13 is held in the expanded position. Therefore, the inclined surface 2221 of the second rod body 222 can limit the reeling axle 121 to rotate unidirectionally.

Figure 7:
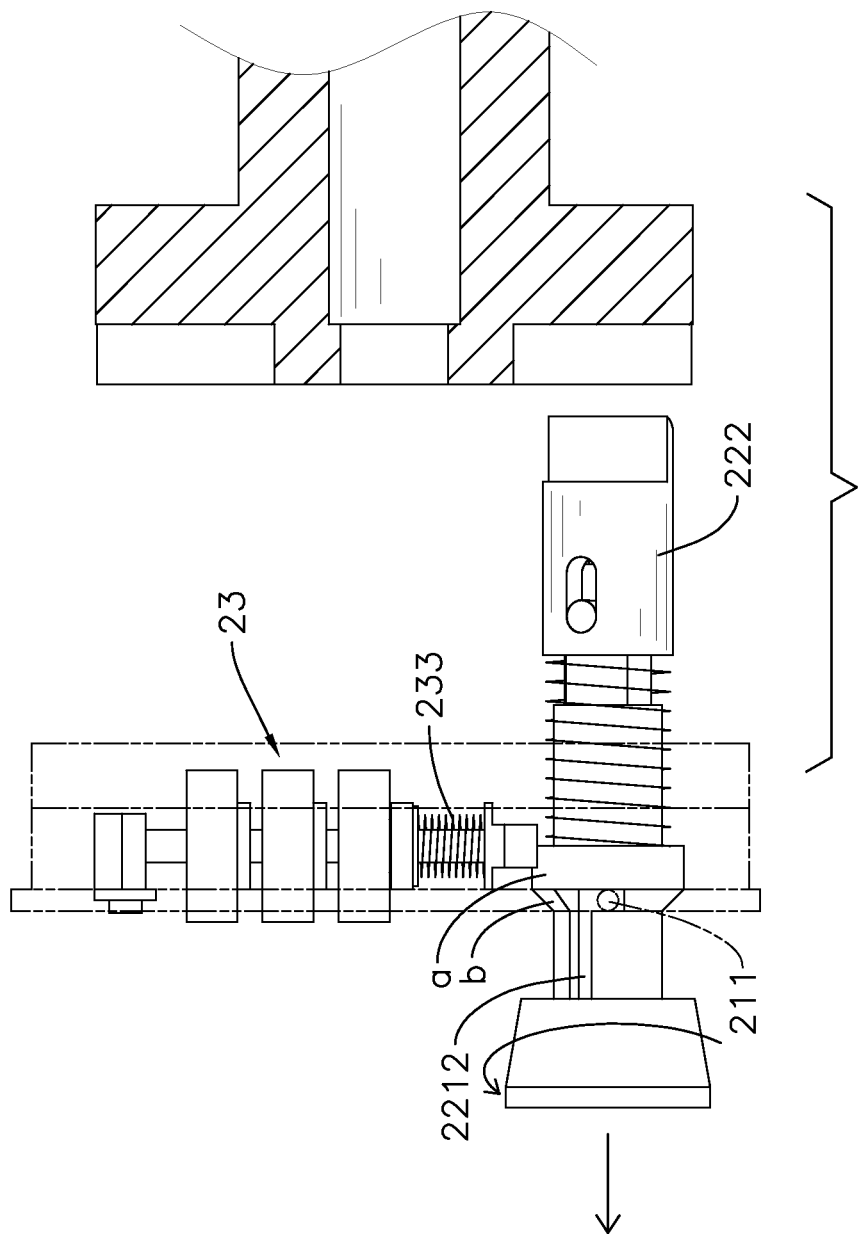
FIG. 7 is another enlarged operational top view in partial section of the lock device of the vehicle cover assembly in FIG. 1.

With reference to FIGS. 6 and 7, to reel the cover fabric 13 into the housing 11, the wheels 232 of the lock cylinder 23 are rotated respectively to the desired positions to unlock the lock cylinder 23. When the lock cylinder 23 is unlocked, the moveable axle 231 can be moved along the longitudinal direction of the moveable axle 231. At this time, the pushing rod 22 can be pushed outward and then rotated to move the protrusion 211 into the end of the groove 2212, and the pushing rod 22 is disengaged from the rotator 122. Accordingly, the cover fabric 13 can be automatically reeled around the reeling axle 121 and into the housing 11 by the torsion unit. At this time, the pushing end of the movable axle 231 abuts the periphery a of the annular flange 2213.

After the cover fabric 13 is reeled around the reeling axle 121, the pushing rod 22 is rotated and pushed backward, and the movable axle 231 abuts the conical surface b of the annular flange 2213. Then, the wheels 232 are rotated to a locked position, such that the pushing rod 22 is kept from being pushed outward. Thus, the lock cylinder 23 is engaged with the pushing rod 22, and the pushing rod 22 is engaged with the reeling axle 121.

With the arrangement of the lock device 20, the expanded fabric cover 13 cannot be reeled when the lock device 20 is in a locked position. The cover fabric 13 will keep covering the vehicle until the lock device 20 is unlocked.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle cover assembly comprising:
   a body having
      a housing;
      a reeling device mounted in the housing and having a reeling axle;
      a cover fabric connected with and selectively reeled around the reeling axle; and
   a lock device having
      a casing mounted on the housing;
      a pushing rod moveably mounted through the casing and having an end selectively engaged with one end of the reeling axle; and
      a lock cylinder mounted in the casing and selectively engaged with the pushing rod, wherein when the lock cylinder is engaged with the pushing rod, the pushing rod is engaged with the reeling axle, wherein
   the reeling axle has multiple engaging recesses arranged annularly; and
   the pushing rod has
      a first rod body mounted through the casing;
      a second rod body having a first end moveably connected with the first rod body, a second end selectively engaged with one of the engaging recesses of the reeling axle, and an inclined surface formed on the second end of the second rod body; and
      a resilient member having two ends connected respectively with the first rod body and the second rod body to push the second rod body to engage with one of the engaging recesses.

2. The vehicle cover assembly as claimed in claim 1, wherein
   the pushing rod has a groove longitudinally defined in an outer surface of the pushing rod and having an end being adjacent to the reeling axle and extending laterally along a periphery of the pushing rod; and
   the casing further has a through hole and a protrusion formed on the through hole and extending slidably into the groove in the pushing rod.

3. The vehicle cover assembly as claimed in claim 2, wherein
   the first rod body of the pushing rod has
      a main body segment mounted through the casing; and
      a connection segment formed on an end of the main body segment adjacent to the reeling device;
   the second rod body of the pushing rod is moveably mounted around the connection segment of the first rod body and has at least one channel defined longitudinally in the second rod body; and
   the pushing rod further has a positioning element securely mounted on the connection segment of the first rod body and having at least one end held respectively in the at least one channel in the second rod body.

4. The vehicle cover assembly as claimed in claim 3, wherein
   the pushing rod has an annular flange formed around the pushing rod and having a conical surface formed on a side of the annular flange opposite the reeling device; and
   the lock cylinder selectively abuts one of a periphery and the conical surface of the annular flange.

5. The vehicle cover assembly as claimed in claim 2, wherein
   the pushing rod has an annular flange formed around the pushing rod and having a conical surface formed on a side of the annular flange opposite the reeling device; and
   the lock cylinder selectively abuts one of a periphery and the conical surface of the annular flange.

6. The vehicle cover assembly as claimed in claim 5, wherein
   the lock cylinder is mounted in the casing and comprises
      a movable axle having a pushing end selectively abutting against the pushing rod;
      multiple wheels rotatably mounted around the moveable axle and each of the wheels partially exposed from the casing; and
      a resilient member connected with the pushing end of the moveable axle to push the pushing end to abut against the pushing rod.

7. The vehicle cover assembly as claimed in claim 2, wherein
   the lock cylinder is mounted in the casing and comprises
      a movable axle having a pushing end selectively abutting against the pushing rod;
      multiple wheels rotatably mounted around the moveable axle and each of the wheels partially exposed from the casing; and
      a resilient member connected with the pushing end of the moveable axle to push the pushing end to abut against the pushing rod.

8. The vehicle cover assembly as claimed in claim 1, wherein
   the first rod body of the pushing rod has
      a main body segment mounted through the casing; and
      a connection segment formed on an end of the main body segment adjacent to the reeling device;
   the second rod body of the pushing rod is moveably mounted around the connection segment of the first rod body and has at least one channel defined longitudinally in the second rod body; and
   the pushing rod further has a positioning element securely mounted on the connection segment of the first rod body and having at least one end held respectively in the at least one channel in the second rod body.

9. The vehicle cover assembly as claimed in claim 8, wherein
   the pushing rod has an annular flange formed around the pushing rod and having a conical surface formed on a side of the annular flange opposite the reeling device; and
   the lock cylinder selectively abuts one of a periphery and the conical surface of the annular flange.

10. The vehicle cover assembly as claimed in claim 1, wherein
    the pushing rod has an annular flange formed around the pushing rod and having a conical surface formed on a side of the annular flange opposite the reeling device; and
    the lock cylinder selectively abuts one of a periphery and the conical surface of the annular flange.

11. The vehicle cover assembly as claimed in claim 10, wherein
    the lock cylinder is mounted in the casing and comprises
       a movable axle having a pushing end selectively abutting against the pushing rod;

multiple wheels rotatably mounted around the moveable axle and each of the wheels partially exposed from the casing; and a resilient member connected with the pushing end of the moveable axle to push the pushing end to abut against the pushing rod.

12. The vehicle cover assembly as claimed in claim 1, wherein the lock cylinder is mounted in the casing and comprises
a movable axle having a pushing end selectively abutting against the pushing rod;
multiple wheels rotatably mounted around the moveable axle and each of the wheels partially exposed from the casing; and
a resilient member connected with the pushing end of the moveable axle to push the pushing end to abut against the pushing rod.

13. A vehicle cover assembly comprising:
a body having
a housing;
a reeling device mounted in the housing and having a reeling axle;
a cover fabric connected with and selectively reeled around the reeling axle; and
a lock device having
a casing mounted on the housing;
a pushing rod moveably mounted through the casing and having an end selectively engaged with one end of the reeling axle; and
a lock cylinder mounted in the casing and selectively engaged with the pushing rod, wherein when the lock cylinder is engaged with the pushing rod, the pushing rod is engaged with the reeling axle, wherein
the pushing rod has an annular flange formed around the pushing rod and having a conical surface formed on a side of the annular flange opposite the reeling device; and
the lock cylinder selectively abuts one of a periphery and the conical surface of the annular flange.

14. The vehicle cover assembly as claimed in claim 13, wherein
the lock cylinder is mounted in the casing and comprises
a movable axle having a pushing end selectively abutting against the pushing rod;
multiple wheels rotatably mounted around the moveable axle and each of the wheels partially exposed from the casing; and
a resilient member connected with the pushing end of the moveable axle to push the pushing end to abut against the pushing rod.

15. A vehicle cover assembly comprising:
a body having
a housing;
a reeling device mounted in the housing and having a reeling axle;
a cover fabric connected with and selectively reeled around the reeling axle; and
a lock device having
a casing mounted on the housing;
a pushing rod moveably mounted through the casing and having an end selectively engaged with one end of the reeling axle; and
a lock cylinder mounted in the casing and selectively engaged with the pushing rod, wherein when the lock cylinder is engaged with the pushing rod, the pushing rod is engaged with the reeling axle, wherein
the lock cylinder is mounted in the casing and comprises
a movable axle having a pushing end selectively abutting against the pushing rod;
multiple wheels rotatably mounted around the moveable axle and each of the wheels partially exposed from the casing; and
a resilient member connected with the pushing end of the moveable axle to push the pushing end to abut against the pushing rod.

* * * * *